(12) United States Patent
Sunaga et al.

(10) Patent No.: US 6,931,172 B2
(45) Date of Patent: Aug. 16, 2005

(54) OPTICAL SWITCH, OPTICAL ADD/DROP APPARATUS, OPTICAL TRANSMISSION SYSTEM, AND METHOD OF PRODUCING OPTICAL SWITCH

(75) Inventors: Takahiro Sunaga, Yokohama (JP); Makoto Katayama, Yokohama (JP); Tomohiko Kanie, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/636,610

(22) Filed: Aug. 8, 2003

(65) Prior Publication Data

US 2004/0028321 A1 Feb. 12, 2004

(30) Foreign Application Priority Data

Aug. 9, 2002 (JP) ...................................... P2002-233657

(51) Int. Cl.⁷ .............................. G02B 6/26; G02B 6/42
(52) U.S. Cl. .............................. 385/18; 385/15; 385/16; 385/21
(58) Field of Search ...................................... 385/15–23

(56) References Cited

U.S. PATENT DOCUMENTS

| | | | |
|---|---|---|---|
| 5,042,889 A | * 8/1991 | Benzoni | 385/16 |
| 5,677,823 A | 10/1997 | Smith | |
| 5,923,798 A | 7/1999 | Aksyuk et al. | |
| 6,229,640 B1 | 5/2001 | Zhang | |
| 6,303,885 B1 | * 10/2001 | Hichwa et al. | 200/181 |
| 6,591,027 B2 | * 7/2003 | Stewart et al. | 385/16 |
| 6,707,176 B1 | * 3/2004 | Rodgers | 310/40 MM |

FOREIGN PATENT DOCUMENTS

WO    WO 01/09653 A1    2/2001

OTHER PUBLICATIONS

Lee et al., Bi–Stable planar polysilicon microactuators with shallow arch–shaped leaf springs, Sep. 1999, SPIE vol. 3876 pp. 274–279.*
SPIE, Conference on Micromachined Devices and Components, SPIE vol. 3876, 1999, "Bi–Stable Planar Polysilicon Microactuators with Shallow Arch–Shaped Leaf Springs", Lee et al., pp. 274–279.

* cited by examiner

*Primary Examiner*—Frank G. Font
*Assistant Examiner*—Derek L. Dupuis
(74) *Attorney, Agent, or Firm*—McDermott Will & Emery LLP

(57) ABSTRACT

An optical switch 1 has a plane waveguide 2 provided with optical waveguide 3, and an actuator structure 5 including a beamlike member 6 supported in a doubly supported manner on the plane waveguide 2. A mirror 10 for shutting out light passing on the optical waveguide 3 is provided in the central region of the beamlike member 6. Interconnecting members 12 extending in the longitudinal direction of the beamlike member 6 are coupled to the both ends of the beamlike member 6. The interconnecting members 12 preliminarily exert a compressive force on the beamlike member 6 so as to deflect the beamlike member 6 with compression stress in an initial state in which the mirror 10 is located at a position where the mirror allows the light passing on the optical waveguide 3 to pass or at a position where the mirror shuts out the light passing on the optical waveguide 3.

13 Claims, 15 Drawing Sheets

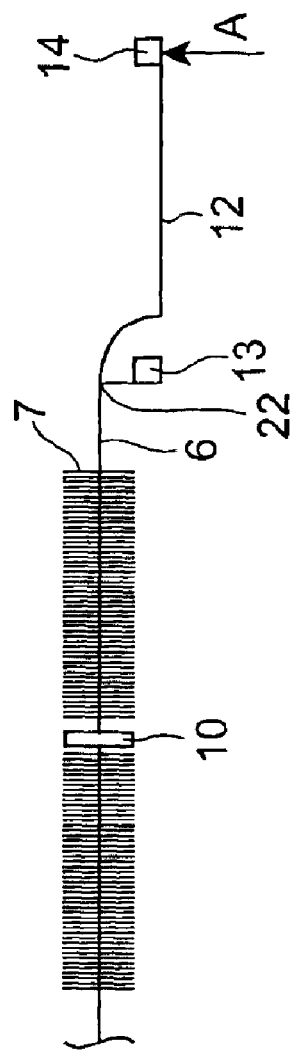
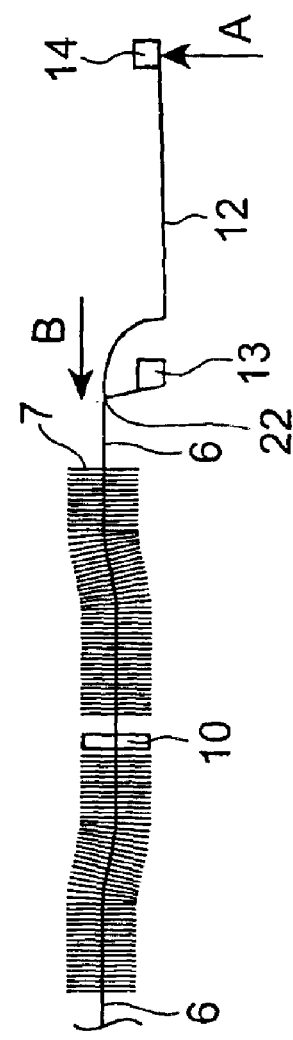
Fig.7A
Fig.7B

OPTICAL SWITCH, OPTICAL ADD/DROP APPARATUS, OPTICAL TRANSMISSION SYSTEM, AND METHOD OF PRODUCING OPTICAL SWITCH

BACKGROUND OF THE INVENTION

1. Field of the Invention

The present invention relates to an optical switch used in optical communications and others, an optical add/drop apparatus, an optical transmission system, and a method of producing an optical switch.

2. Related Background Art

The known technologies in this field include, for example, the optical switch described in SPIE, Conference on Micromachined Devices and Components, SPIE Vol. 3876, 1999. This optical switch is constructed in such structure that leaf springs are attached perpendicularly to an extending direction of an actuator provided with a mirror and are arranged to deflect with movement of the actuator, so as to make the mirror self-hold at an as-moved position.

SUMMARY OF THE INVENTION

An object of the present invention is to provide a compact, highly integratable, optical switch with a function of holding the position of a mirror, an optical add/drop apparatus, an optical transmission system, and a method of producing an optical switch.

An optical switch of the present invention comprises a base member having an optical path; a beamlike member supported in a doubly supported manner on an upper surface of the base member; a mirror fixed to the beamlike member and configured to shut out light passing on the optical path; driving means for moving the mirror horizontally; and compressive force exerting means for preliminarily exerting a compressive force on the beamlike member so as to deflect the beamlike member with compression stress in an initial state in which the mirror is located at a position where the mirror allows the light passing on the optical path to pass or at a position where the mirror shuts out the light passing on the optical path.

The optical switch of this structure is constructed so that the beamlike member with the mirror for shutting out the light passing on the optical path is deflected by the compressive force exerted by the compressive force exerting means and so that the mirror is horizontally moved in that state. For example, in the case where the mirror is moved from the initial state in which the mirror is located at the position where the mirror allows the light passing on the optical path to pass (pass position) to the position where the mirror shuts out the light passing on the optical path (shut position), the beamlike member is deflected in the opposite direction by the driving means. In this state the beamlike member also suffers compression stress and is deflected in a state in which the compressive force equivalent to that in the initial state is exerted thereon.

Since the optical switch is constructed so that the mirror is provided on the beamlike member and is moved between the pass position and the shut position by deflecting the beamlike member in the directions opposite to each other as described above, no large space is necessary in the moving directions of the mirror (the directions perpendicular to the extending direction of the beamlike member). This achieves implementation of the compact, highly integrated, optical switch. When the mirror is located at either of the pass position and the shut position, the beamlike member is deflected under the compression stress acting condition, so that the beamlike member (mirror) is stably self-held at the position after being driven, without continuously applying the driving force by the driving means.

Preferably, the optical switch is constructed in a configuration wherein the compressive force exerting means comprises an interconnecting member coupled to an end portion of the beamlike member and extending in a longitudinal direction of the beamlike member and is constructed so that the compressive force exerting means exerts the compressive force on the beamlike member by exerting a force in a direction intersecting with the extending direction of the interconnecting member, on the interconnecting member. When the compressive force is exerted on the beamlike member by making use of the moment in this way, the beamlike member can be deflected by a smaller force. Since the interconnecting member is coupled to the end of the beamlike member so as to extend in the longitudinal direction of the beamlike member, the space can be saved in the directions perpendicular to the extending direction of the beamlike member, and the optical switch can be constructed in much smaller size.

Preferably, the compressive force exerting means further comprises an auxiliary member fixed to the interconnecting member and adapted for exerting the force in the direction intersecting with the extending direction of the interconnecting member, on the interconnecting member; and a recess provided in the base member and configured to be engaged with the auxiliary member; the auxiliary member is positioned relative to the recess so as to exert the compressive force on the beamlike member in the initial state, and in that state the beamlike member is fixed to the upper surface of the base member. In this case, the beamlike member and the base member are moved relative to each other in a state in which the auxiliary member is set in the recess, whereupon the recess engaged with the auxiliary member exerts the force in the direction intersecting with the extending direction of the interconnecting member, on the auxiliary member, so as to exert the compressive force on the beamlike member eventually. Then the beamlike member comes to be deflected by the compressive force, and the beamlike member is then fixed to the upper surface of the base member in that state. Since the compressive force can be exerted on the beamlike member by simply moving the beamlike member and the base member relative to each other in this way, the beamlike member can be readily deflected, without need for provision of separate means for exerting the force on the beamlike member.

The optical switch may be constructed so that the compressive force exerting means further comprises a projection provided on the base member and configured to be engaged with the interconnecting member to exert the force in the direction intersecting with the extending direction of the interconnecting member, on the interconnecting member, and so that the interconnecting member is positioned relative to the base member so as to exert the compressive force on the beamlike member in the initial state, and in that state the beamlike member is fixed to the upper surface of the base member. In this case, when the beamlike member and the base member are moved relative to each other, the projection provided on the base member exerts the force in the direction intersecting with the extending direction of the interconnecting member, on the interconnecting member, so as to exert the compressive force on the beamlike member. Then the beamlike member comes to be deflected by the compressive force, and the beamlike member is fixed to the upper surface of the base member in that state. Since the compressive force can be exerted on the beamlike member by simply moving the beamlike member and the base member relative to each other in this way, the beamlike member can be readily deflected, without need for provision of separate means for exerting the force on the beamlike member.

Furthermore, the optical switch may be constructed so that the compressive force exerting means further comprises means for moving the interconnecting member in the direction intersecting with the extending direction of the interconnecting member, and so that in a state in which the interconnecting member is moved in the direction intersecting with the extending direction of the interconnecting member so as to exert the compressive force on the beamlike member in the initial state, the beamlike member is fixed to the upper surface of the base member. Such means for moving the interconnecting member in the direction intersecting with the extending direction of the interconnecting member can be, for example, means for generating an electrostatic force between the interconnecting member and an electrode provided in parallel with the interconnecting member. In this case, since the interconnecting member can be moved by simply mounting the electrode and generating static electricity between the electrode and the interconnecting member, the compressive force can be readily exerted on the beamlike member in the initial state. Therefore, it facilitates designing and machining of the optical switch.

Preferably, such interconnecting members are coupled to both ends of the beamlike member. This configuration permits approximately equal compressive forces to be exerted on the beamlike member from the both sides, whereby the beamlike member can be deflected in good balance.

Preferably, the driving means comprises a first electrode provided on one side of the beamlike member above the base member, a second electrode provided on the other side of the beamlike member above the base member, and means for generating an electrostatic force between the beamlike member and the first electrode or an electrostatic force between the beamlike member and the second electrode. In this case, when the electrostatic force is generated between the first electrode and the beamlike member in the initial state in which the mirror is located at the pass position or at the shut position, the mirror moves to the opposite position. If thereafter the electrostatic force is generated between the second electrode and the beamlike member, the mirror returns to the initial state. The use of the electrostatic force in this way permits the beamlike member to be driven with small power consumption.

In this case, preferably, on the both sides of the beamlike member a plurality of first comb teeth are provided so as to be opposed to the first electrode and to the second electrode, and the first electrode and the second electrode are provided with a plurality of second comb teeth interposed between the first comb teeth. This configuration permits a large electrostatic force to be generated between the beamlike member and the first electrode/the second electrode by a small applied voltage.

Preferably, the beamlike member, the mirror, the first electrode, and the second electrode are made of electrically conductive Si, and a surface of the mirror is coated with Au, Ag, or Al. When the beamlike member, the mirror, the first electrode, and the second electrode are made of electrically conductive Si in this way, these members can be inexpensively and readily fabricated. When the surface of the mirror is coated with either Au, Ag, or Al, the mirror can be obtained with high reflectance and with high performance.

Preferably, the base member has multiple sets of the optical paths, and a plurality of actuator structures each comprising the beamlike member and the mirror are arranged in an array pattern corresponding to the multiple sets of optical paths above the base member. This achieves compact packaging of a plurality of optical switches.

In this case, preferably, an arrangement spacing between the actuator structures is not more than 1 mm. This implements more compact packaging of multiple optical switches and permits implementation of highly integrated and multichannel optical switches.

An optical add/drop apparatus of the present invention comprises the above-stated optical switches. Since the optical add/drop apparatus comprises a plurality of such optical switches arrayed, it can be realized in compact size and in high integration.

An optical transmission system of the present invention comprises the above-stated optical switches. When this optical transmission system is applied, for example, to a ring network linked by a plurality of optical modules provided with the optical switches, even if any optical module suffers failure, the other optical modules can maintain transmission of light so as to prevent interruption of optical transmission. When the aforementioned optical switches are applied to this optical transmission system, the component units of the optical transmission system like the optical modules can be made smaller in size.

A method of producing an optical switch according to the present invention comprises a step of fabricating a base member having an optical path; a step of fabricating a beamlike member to which a mirror for shutting out light passing on the optical path is fixed; and a step of exerting a compressive force on the beamlike member so as to deflect the beamlike member with compression stress in an initial state in which the mirror is located at a position where the mirror allows the light passing on the optical path to pass or at a position where the mirror shuts out the light passing on the optical path, and, in that state, fixing the beamlike member to an upper surface of the base member so as to support the beamlike member in a doubly supported manner thereon.

In the production method of the present invention, the mirror is provided on the beamlike member and the beamlike member is deflected in the directions opposite to each other, so as to move the mirror between the pass position and the shut position; therefore, no large space is necessary in the moving directions of the mirror (the directions perpendicular to the extending direction of the beamlike member) This achieves implementation of the compact, highly integrated, optical switch. When the mirror is located at either of the pass position and the shut position, the beamlike member is deflected under the compression stress acting condition, and thus the beamlike member (mirror) can be stably self-held at the position after driven, without need for continuously applying the driving force by the driving means.

Preferably, in the step of fabricating the beamlike member, an interconnecting member extending in a longitudinal direction of the beamlike member is coupled to an end portion of the beamlike member, and in the step of fixing the beamlike member to the upper surface of the base member, a force in a direction intersecting with the extending direction of the interconnecting member is exerted on the interconnecting member, so as to exert the compressive force on the beamlike member in the initial state. When the compressive force is exerted on the beamlike member by making use of the moment in this way, the beamlike member can be deflected by a smaller force. When the interconnecting member is coupled to the end portion of the beamlike member so as to extend in the longitudinal direction of the beamlike member, the space can be saved in the directions perpendicular to the extending direction of the beamlike member and the optical switch can be made in more compact size.

BRIEF DESCRIPTION OF THE DRAWINGS

FIG. 7A and FIG. 7B are illustrations showing an exerting process of the compressive force by the compressive force exerting means of the optical switch shown in FIG. 1.

DESCRIPTION OF THE PREFERRED EMBODIMENTS

The preferred embodiments of the optical switch, the optical add/drop apparatus, the optical transmission system, and the production method of the optical switch according to the present invention will be described below with reference to the drawings.

Figure 1:
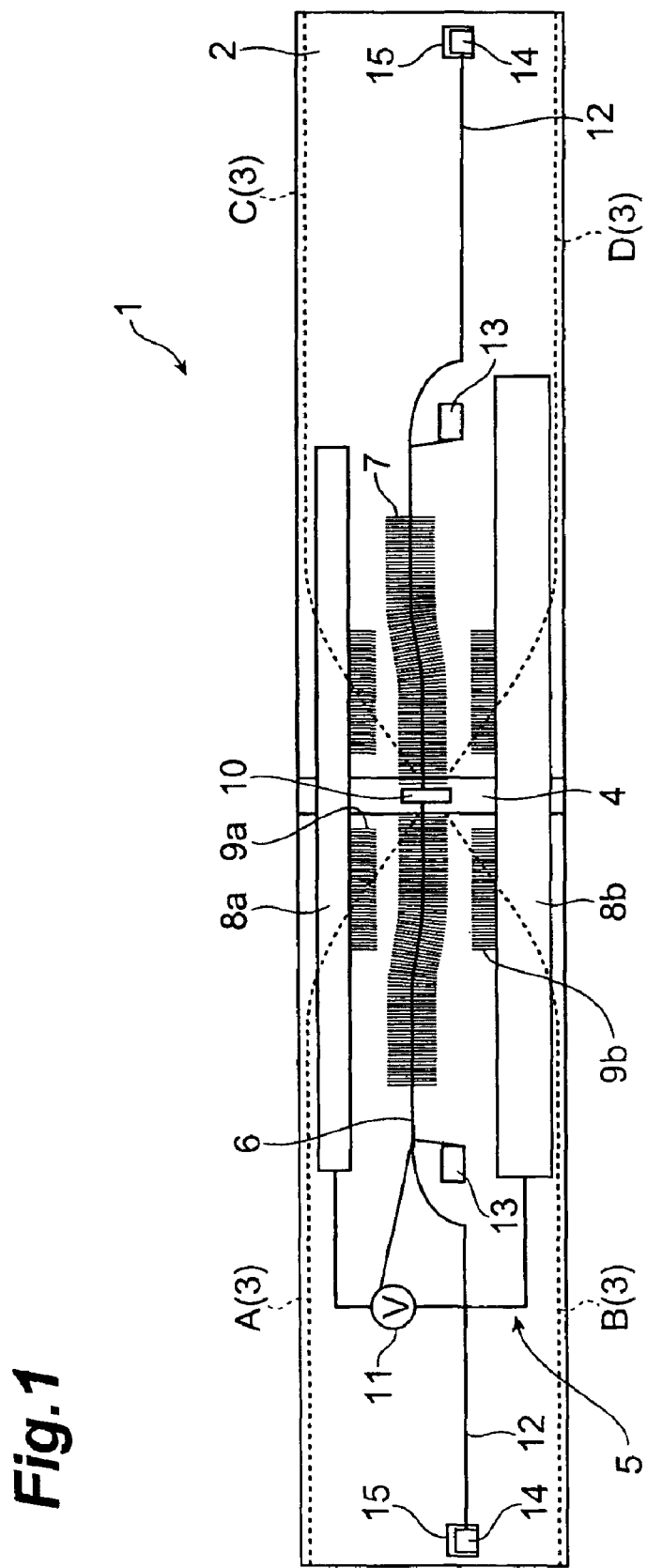
FIG. 1 is a plan view showing the optical switch according to the first embodiment of the present invention.
Figure 2:
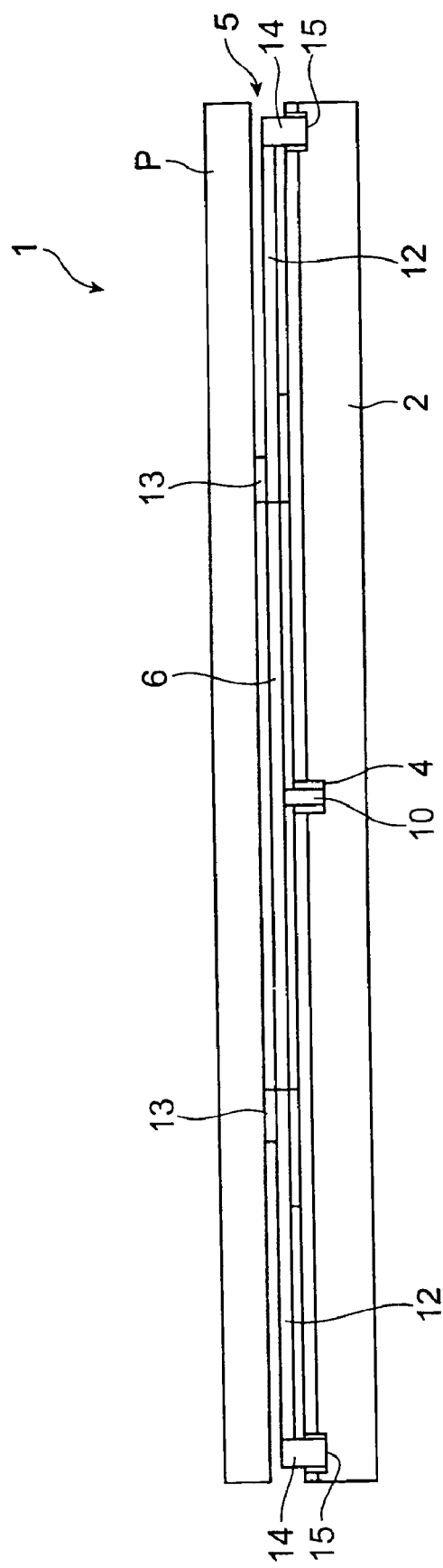
FIG. 2 is a side view of the optical switch shown in FIG. 1.

FIG. 1 is a plan view showing the optical switch according to the first embodiment of the present invention, and FIG. 2 a side view thereof. In FIG. 1, the optical switch 1 has a plane waveguide 2, and this plane waveguide 2 is provided with optical waveguide 3 forming optical paths A–D of approximately cross shape. The plane waveguide 2 is also provided with groove 4 connected to the optical paths A–D.

An actuator structure 5 formed by Micro Electro Mechanical Systems (MEMS) technology is provided on the plane waveguide 2. The actuator structure 5 has a substrate P, and a beamlike member 6 is fixed to this substrate P. The beamlike member 6 is supported in a doubly supported manner in a deflected state on an upper surface of the plane waveguide 2 so that the central region thereof is located at the groove 4. A plurality of comb teeth 7 are provided on both sides of the beamlike member 6.

The actuator structure 5 has two electrodes 8a, 8b disposed on the both sides of the beamlike member 6, and these electrodes 8a, 8b are provided with a plurality of comb teeth 9a, 9b, respectively, interposed between the opposing comb teeth 7 of the beamlike member 6.

A mirror 10 for reflecting light passing on the optical path A toward the optical path B is fixed in the central part of the beamlike member 6. This mirror 10 is constructed so as to intrude into the groove 4 of the plane waveguide 2.

The beamlike member 6, mirror 10, and electrodes 8a, 8b are desirably made of electrically conductive Si, in order to facilitate cost reduction and production. The surface of mirror 10 is preferably coated with a coating of gold (Au), silver (Ag), aluminum (Al), or the like in view of improvement in reflectance.

The beamlike member 6 and the electrodes 8a, 8b are connected through voltage source 11, and this voltage source 11 applies a predetermined voltage between the beamlike member 6 and the electrode 8a, 8b to generate an electrostatic force between them. Then the beamlike member 6 is attracted to the electrode 8a, 8b to which the voltage is applied, by the electrostatic force.

When the static electricity is used in this way, the beamlike member 6 can be driven with small power consumption. Furthermore, since the beamlike member 6 and the electrodes 8a, 8b are provided with their respective comb teeth 9a, 9b, a large electrostatic force can be generated even by a small applied voltage.

Interconnecting members 12 extending in the longitudinal direction of the beamlike member 6 are coupled to both ends of the beamlike member 6. A connection-side (the distal end side of interconnecting member 12) part of each interconnecting member 12 to the beamlike member 6 is of arcuately curved shape. The distal end of each interconnecting member 12 is coupled to anchor 13 which joins the plane waveguide 2 to the actuator structure 5. On the other hand, an auxiliary member 14 is provided at the base end of each interconnecting member 12 located opposite to the connection side to the beamlike member 6, and this auxillary member 14 is set in recess 15 provided in the plane waveguide 2 to be engaged therewith. The interconnecting members 12 are fixed in a state in which in the initial state of the beamlike member 6 a compressive force is exerted thereon in the extending direction of the beamlike member 6, whereby the beamlike member 6 is deflected with compression stress.

Figure 3:
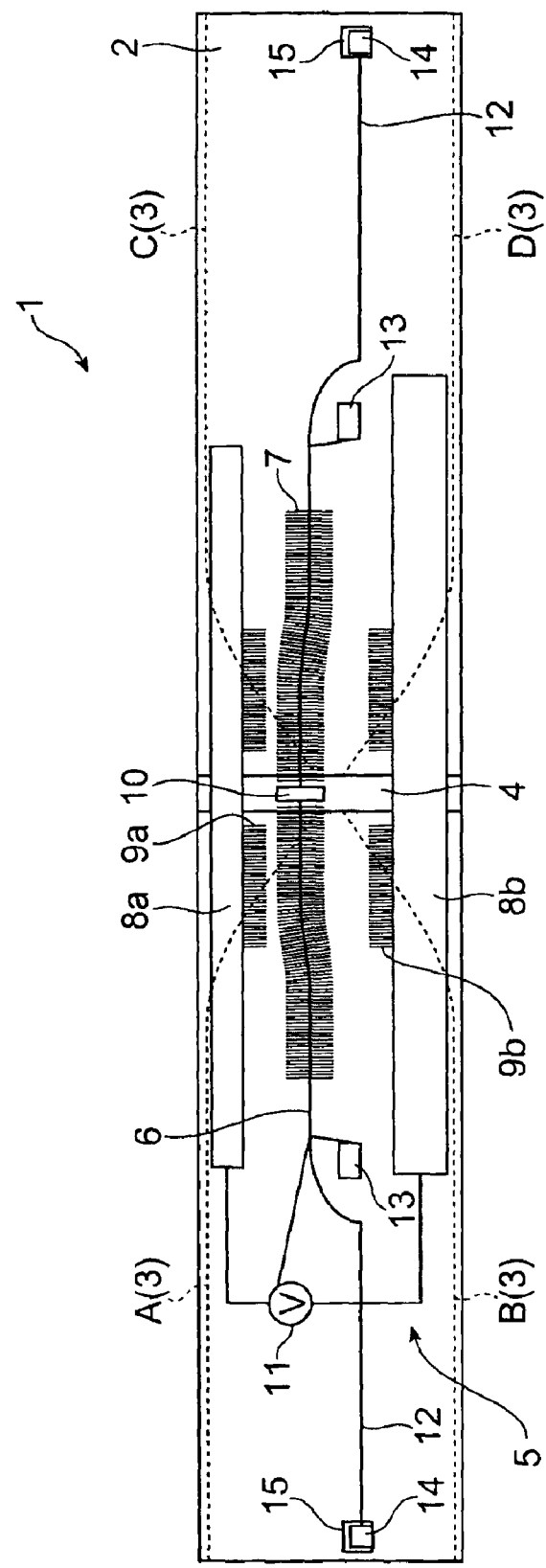
FIG. 3 is a drawing showing a state after the mirror of the optical switch shown in FIG. 1 has been moved.

In the optical switch 1 of the present embodiment as described above, for example, in the case wherein the initial state is a state in which the mirror 10 is located at the position where the mirror 10 shuts out the light passing on the optical path A (shut position) (FIG. 1) and wherein the mirror 10 is moved from this state to the position where it allows the light passing on the optical path A to pass (pass position), a voltage is placed between the beamlike member 6 and the electrode 8a to generate an electrostatic force. Then, as shown in FIG. 3, the beamlike member 6 is attracted toward the electrode 8a to be deflected to the opposite side to the deflection in the initial state, whereby the mirror 10 moves to the pass position.

At this time, even after the mirror 10 has been moved from the initial state to the pass position, the beamlike member 6 also experiences compression stress and is deflected in a state in which the compressive force equivalent to that in the initial state is exerted thereon. For this reason, the mirror can be stably self-held at the position after being moved, without need for continuously applying the voltage between the beamlike member 6 and the electrode 8a.

On the other hand, for returning the mirror 10 from the pass position to the initial state (shut position), a voltage is placed between the beamlike member 6 and the electrode 8b to generate an electrostatic force. Then the beamlike member 6 is attracted toward the electrode 8b to be deflected, whereby the mirror 10 is moved to the initial state as shown in FIG. 1.

Since the mirror 10 can be moved between the pass position and the shut position by simply deflecting the beamlike member 6 in the directions opposite to each other in this way, no large space is necessary in the directions perpendicular to the extending direction of the beamlike member 6. This achieves implementation of the compact, highly integrated, optical switch.

Figure 4:
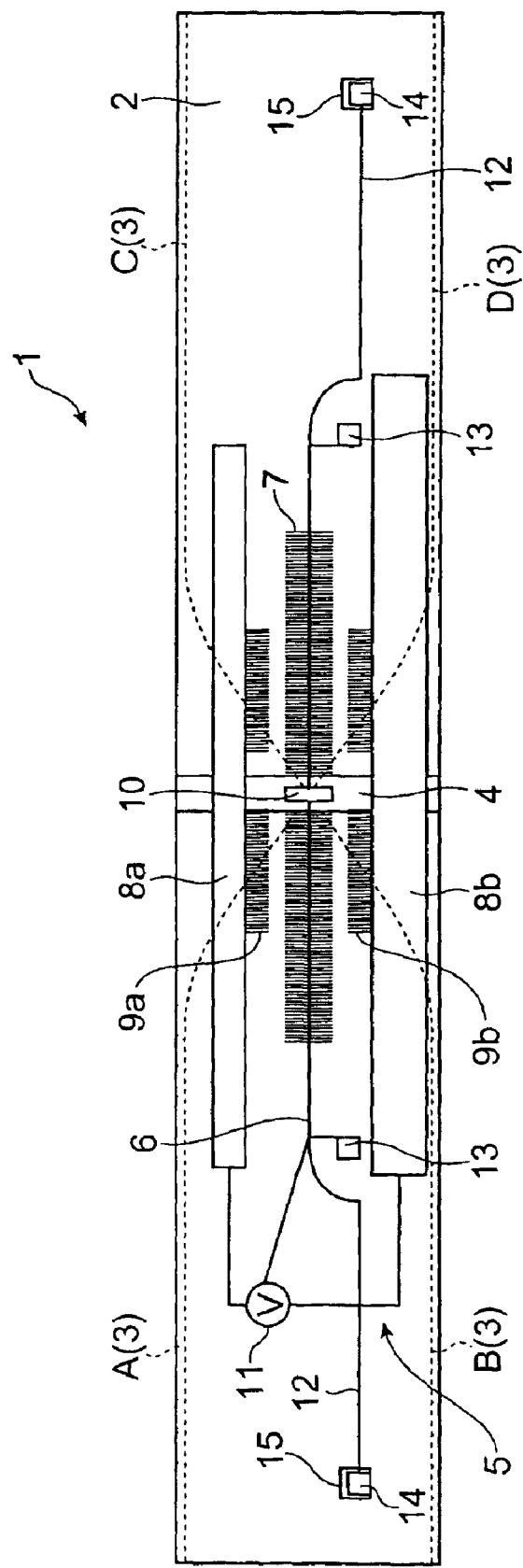
FIG. 4 is a drawing showing a state before the compressive force is exerted on the beamlike member of the optical switch shown in FIG. 1.

A production method of the optical switch 1 according to the present embodiment will be described below. The first step is to fabricate the plane waveguide 2, and the actuator structure 5 including the beamlike member 6 and the mirror 10 as described above. In the process of fabricating the beamlike member 6, the interconnecting members 12 are coupled to the ends of the beamlike member 6. In the next step, as shown in FIG. 4, the auxiliary members 14 of the interconnecting members 12 are positioned relative to the recesses 15 of the plane waveguide 2 and inserted thereinto. At this time, the plane waveguide 2 and the actuator structure 5 are in a state in which they deviate from each other from their regular joint position.

Figure 5:
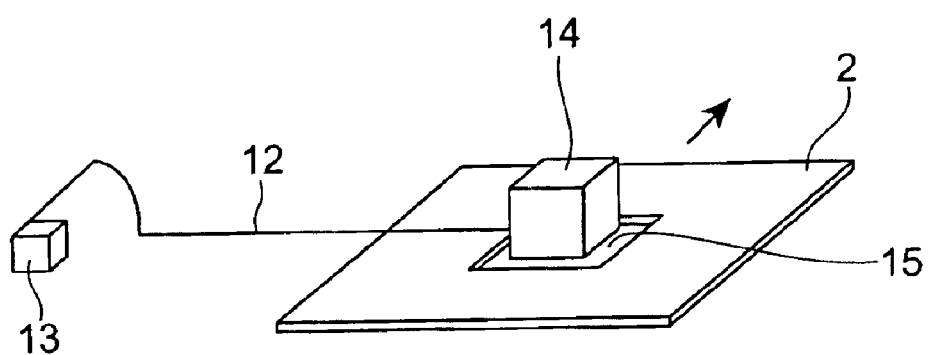
FIG. 5 is a partial perspective view showing part of the compressive force exerting means of the optical switch shown in FIG. 1.

Thereafter, the plane waveguide 2 and the actuator structure 5 are moved relative to each other up to the regular joint position thereof. This results in exerting a compressive force on the beamlike member 6 and deflecting the beamlike member 6 by the compressive force as shown in FIG. 1. At this time, as shown in FIG. 5, the actuator structure 5 and the plane waveguide 2 are moved relative to each other in the state in which the auxiliary members 14 are set in the recesses 15, whereby the auxiliary members 14 each experience a force exerted by the engaging recess 15 in the direction approximately perpendicular to the extending direction of the interconnecting member 12. Then the actuator structure 5 is joined (fixed) to the upper surface of the plane waveguide 2 in that state.

Figure 6A:
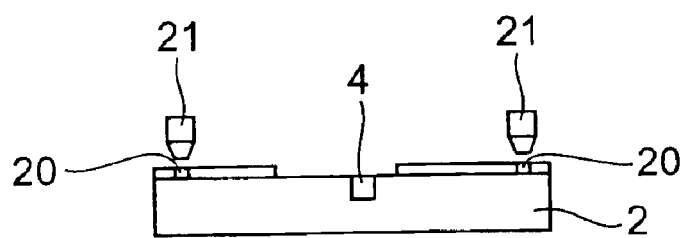
FIG. 6A, FIG. 6B and FIG. 6C are schematic illustrations showing a joining process of the optical switch shown in FIG. 1.
Figure 6B:
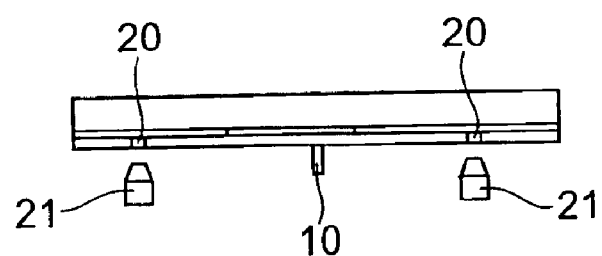
Figure 6C:
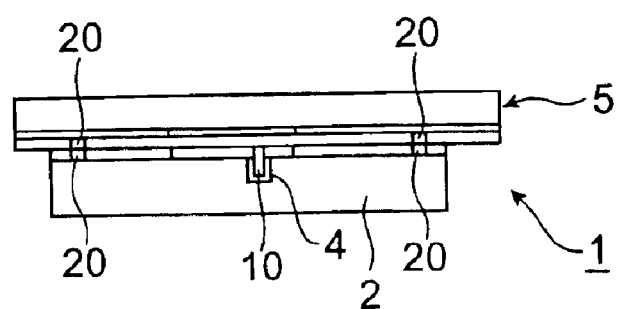

Concerning the joining between the plane waveguide 2 and the actuator structure 5, for example, as shown in FIG. 6A, FIG. 6B and FIG. 6c, whether alignment marks 20 of the plane waveguide 2 and the actuator structure 5 match each other is observed, for example, with microscope 21 or the like (FIG. 6A and FIG. 6B), and thereafter the plane waveguide 2 and the actuator structure 5 with their alignment marks 20 matching each other are joined to each other with an adhesive or the like (FIG. 6C).

FIG. 7A and FIG. 7B is illustrations showing a process in which the auxiliary member 14 exerts the compressive force on the beamlike member 6. When a force (indicated by arrow A in the figure) in the direction approximately perpendicular to the extending direction of the interconnecting member 12 is exerted on the auxiliary member 14 in a state in which no compressive force is exerted on the beamlike member 6 as shown in FIG. 7A, a force (indicated by arrow B in the figure) is exerted on connection point 22 between the interconnecting member 12 and the beamlike member 6, as shown in FIG. 7B. Namely, the compressive force is exerted on the beamlike member 6, so that the beamlike member 6 comes to be deflected as a result.

When the force in the direction intersecting with the extending direction of the interconnecting member 12 is exerted on the interconnecting member 12 in this way, the moment can be utilized, and thus the beamlike member 6 can be deflected by a smaller force. Since the connection portion of the interconnecting member 12 to the beamlike member 6 is of the arcuately curved shape, the greater moment can be made to act even by a small force exerted on the interconnecting member 12.

Furthermore, the interconnecting member 12 is connected to the end of the beamlike member 6 so as to extend in the longitudinal direction of the beamlike member 6, whereby the space can be saved in the directions perpendicular to the extending direction of the beamlike member 6.

Since the compressive force can be exerted on the beamlike member 6 by simply moving the actuator structure 5 and the plane waveguide 2 relative to each other as described above, the beamlike member 6 can be readily deflected, without need for providing any separate means for exerting the force on the beamlike member 6.

Figure 8:
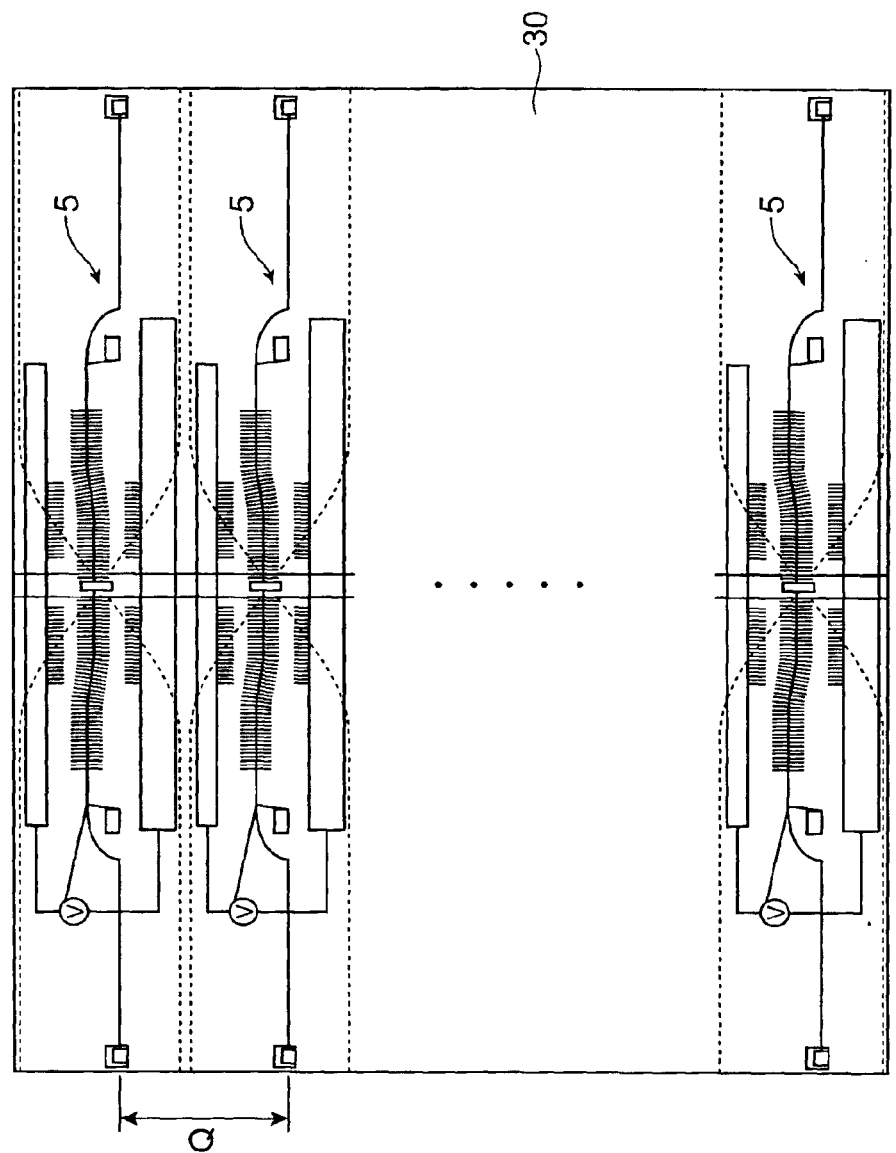
FIG. 8 is a drawing showing an arrayed state of optical switches shown in FIG. 1.

Since the above optical switch 1 achieves space saving in the directions perpendicular to the extending direction of the beamlike member 6, it becomes feasible to provide multiple sets of optical paths in the plane waveguide 30 and place an array of multiple actuator structures 5 corresponding to the multiple sets of optical paths above the plane waveguide 30, as shown in FIG. 8. This implements compact packaging of multiple optical switches and also implements high integration and multi-channel structure. An arrangement spacing Q between the actuator structures 5 is preferably not more than 1 mm.

In the process of fabricating the optical switch in the array structure, the array of multiple actuator structures 5 are moved together relative to the plane waveguide 2, and they are joined to the waveguide. This permits easy and efficient fabrication of the highly integrated and multi-channel optical switch.

Figure 9:
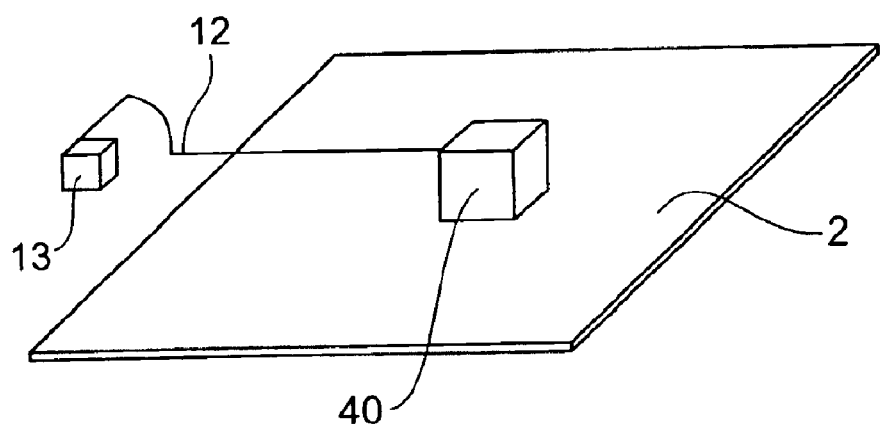
FIG. 9 is a partial perspective view showing a modification example of the compressive force exerting means shown in FIG. 5.

Next, another means for exerting the force in the direction intersecting with the extending direction of the interconnecting member 12, on the interconnecting member 12 will be described with reference to FIG. 9. In the same figure, projection 40 is provided on the plane waveguide 2 and this projection 40 is engaged with the interconnecting member 12. In this case, when the plane waveguide 2 and the actuator structure 5 are moved relative to each other, the projection 40 provided on the plane waveguide 2 exerts the force in the direction intersecting with the extending direction of the interconnecting member 12, on the interconnecting member 12, so as to exert the compressive force on the beamlike member 6. Then the beamlike member 6 comes to be deflected by the compressive force, and in that state the actuator structure 5 is fixed to the upper surface of the plane waveguide 2.

In this case, the compressive force can also be exerted on the beamlike member 6 by simply moving the plane waveguide 2 and the actuator structure 5 relative to each other, whereby the beamlike member 6 can be readily deflected, without need for providing any separate means for exerting the force on the beamlike member 6.

Next, the optical switch according to the second embodiment of the present invention will be described with reference to FIGS. 10 to 12. The optical switch of the present embodiment is different in the means for exerting the compressive force on the beamlike member, from the optical switch of the first embodiment.

Figure 10:
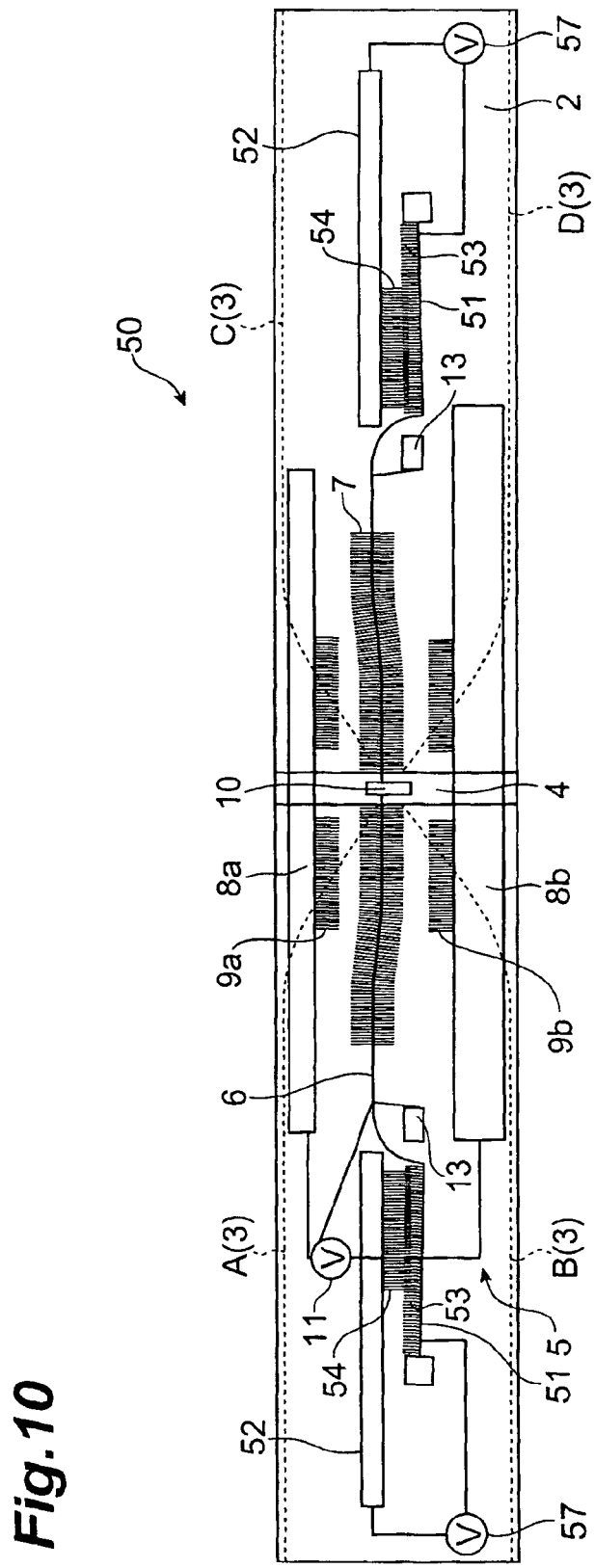
FIG. 10 is a plan view showing the optical switch according to the second embodiment of the present invention.
Figure 11:
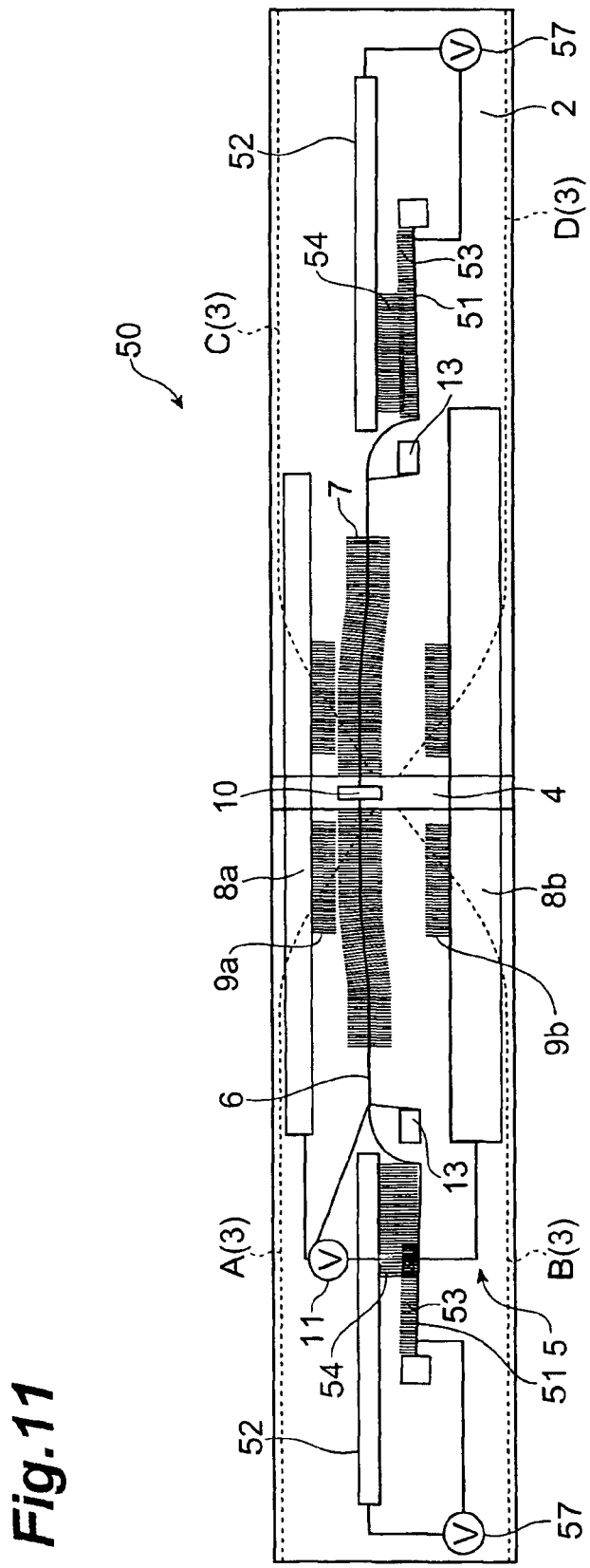
FIG. 11 is a drawing showing a state after the mirror of the optical switch shown in FIG. 10 has been moved.

FIG. 10 is a plan view showing the optical switch according to the present embodiment. In the same figure, the actuator structure 5 of the optical switch 50 has interconnecting members 51 connected to the both ends of the beamlike member 6, and electrodes 52 provided in parallel with the interconnecting members 51. A plurality of comb teeth 53 are provided on the side where the interconnecting members 51 face the electrodes 52, and each of the electrodes 52 is provided with a plurality of comb teeth 54 interposed between the comb teeth 53 of the interconnecting members 51. Each set of interconnecting member 51 and electrode 52 are connected through voltage source 57, and a predetermined voltage is applied between the interconnecting member 51 and the electrode 52 by the voltage source 57 to generate an electrostatic force between them.

In the optical switch 50 of this configuration, just as in the first embodiment, the interconnecting members 51, electrodes 52, and voltage sources 57 exert the compressive force on the beamlike member 6 in the initial state, whereby the beamlike member 6 is in a deflected state with compression stress. Then the beamlike member 6 is deflected to the opposite side upon movement of the mirror 10 from the shut position to the pass position as shown in FIG. 11, whereby the mirror 10 is self-held at the position.

Figure 12:
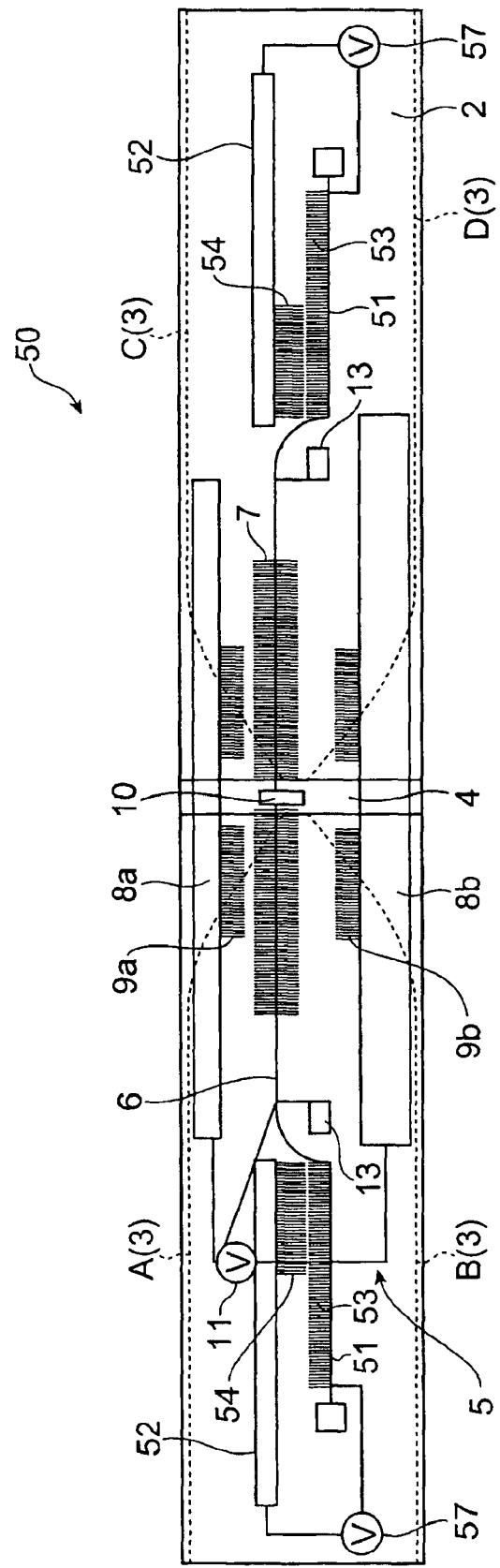
FIG. 12 is a drawing showing a state before the compressive force is exerted on the beamlike member of the optical switch shown in FIG. 10.

For deflecting the beamlike member 6 by the compressive force exerted by the interconnecting members 51, the electrostatic force is first generated between the interconnecting members 51 and the electrodes 52 from the state shown in FIG. 12 to move the interconnecting members 51 toward the electrodes 52. Then the interconnecting members 51 exert the compressive force on the beamlike member 6 to deflect the beamlike member 6. Then the plane waveguide 2 and actuator structure 5 are stacked and joined to each other in that state.

Since the optical switch 50 as described above can readily exert the compressive force on the beamlike member 6 without need for precise positioning, designing thereof becomes easier.

The above embodiment employed the configuration of driving the interconnecting members 51 by the electrostatic actuators, but, without having to be limited particularly to this configuration, it is also possible to use electromagnetic actuators or the like.

Figure 13:
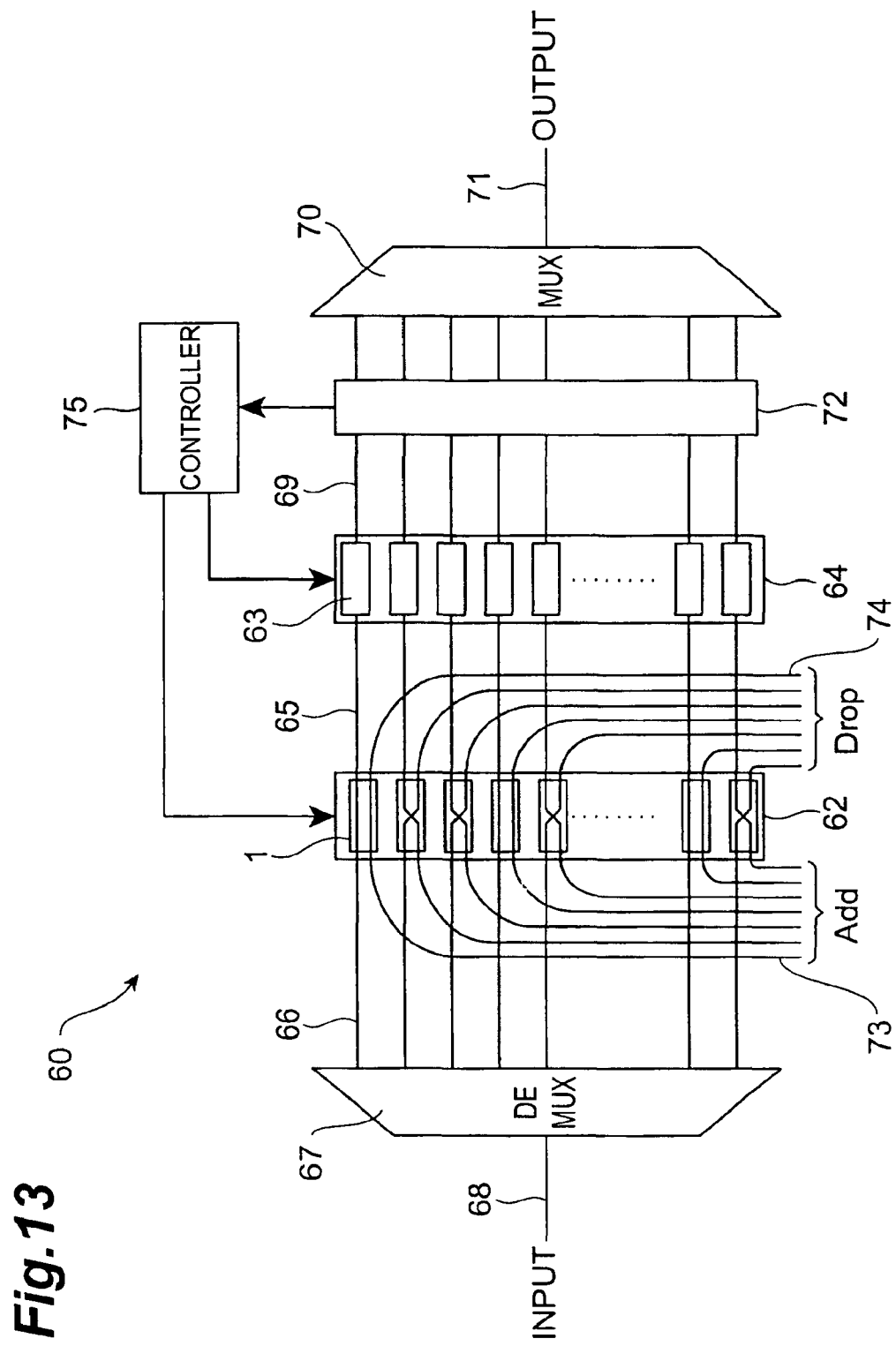
FIG. 13 is a configuration diagram showing an example of the optical add/drop apparatus to which the optical switches according to an embodiment of the present invention are applied.

FIG. 13 shows an example of the optical add/drop apparatus (OADM) provided with the optical switches described above. The optical add/drop apparatus has the Add/Drop function of adding or dropping a signal of an arbitrary wavelength out of wavelength-multiplexed signals.

The optical add/drop apparatus 60 is provided with an optical switch array 62 having a plurality of above-stated optical switches 1, and an optical variable attenuator array 64 having a plurality of optical variable attenuators 63. Each optical switch 1 is connected through waveguide 65 to a corresponding attenuator 63. Each optical switch 1 is connected through waveguide 66 to demultiplexer 67. This demultiplexer 67 demultiplexes optical signals of different wavelengths having propagated through one optical fiber 68, on a wavelength-by-wavelength basis. Each optical variable attenuator 63 is connected through waveguide 69 to multiplexer 70. This multiplexer 70 multiplexes optical signals of respective wavelengths and guides the multiplexed signals to one optical fiber 71. Each waveguide 69 is provided with optical monitor 72 for detecting the power of light attenuated by the optical variable attenuator 63. An Add waveguide 73 and a Drop waveguide 74 are connected to each optical switch 1.

The optical switch array 62, optical variable attenuator array 64, and optical monitor 72 are connected to controller 75. This controller 75 has a plurality of voltage sources for supplying a voltage to each optical switch 1, and a plurality of voltage sources for supplying a voltage to each optical variable attenuator 63. The controller 75 supplies a voltage signal to each optical switch 1 to effect optical path switching of the waveguides 65, 66, 73, 74. The controller 75 feeds a voltage signal to each optical variable attenuator 63 so that quantity of output light becomes a desired value, based on a detected value by the optical monitor 72.

Figure 14:
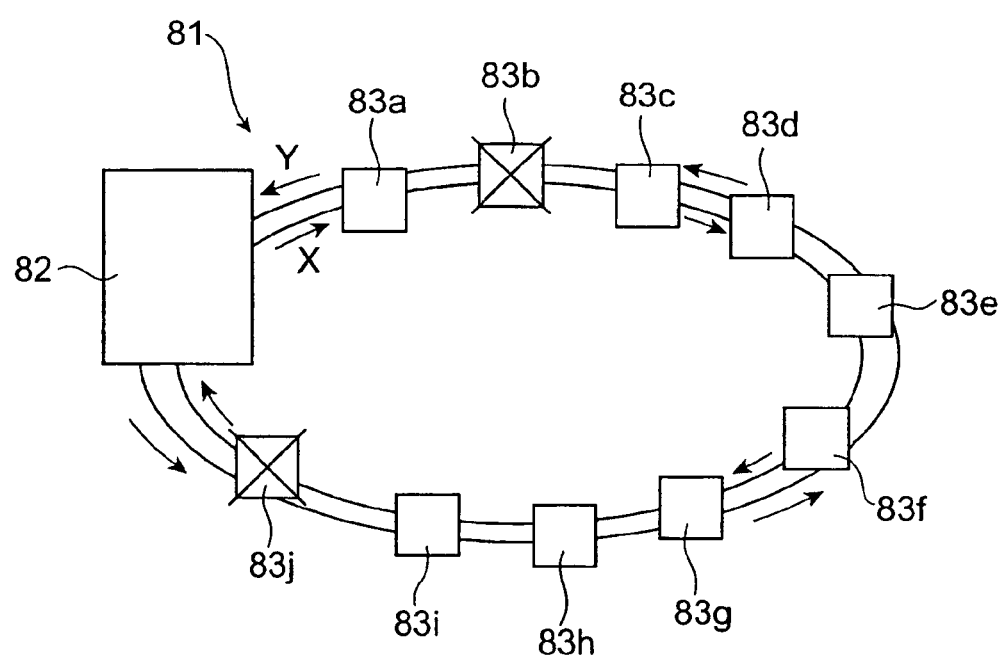
FIG. 14 is a configuration diagram showing an example of a ring network provided with the optical transmission system to which the optical switches according to an embodiment of the present invention are applied.

FIG. 14 shows an example of the optical transmission system provided with the optical switches described above. The present optical transmission system is applied to a ring network linked by multiple optical modules with optical switches, and even if any optical module suffers failure, the other optical modules can maintain transmission of light, so as to prevent interruption of optical transmission.

In FIG. 14, the ring network 81 with the optical transmission system 80 is constructed so that center controller 82 and a plurality of nodes (crossroads) 83a–83j are linked in a ring shape and optical signals from the center controller 82 are transmitted via the multiple nodes 83a–83j.

Figure 15:
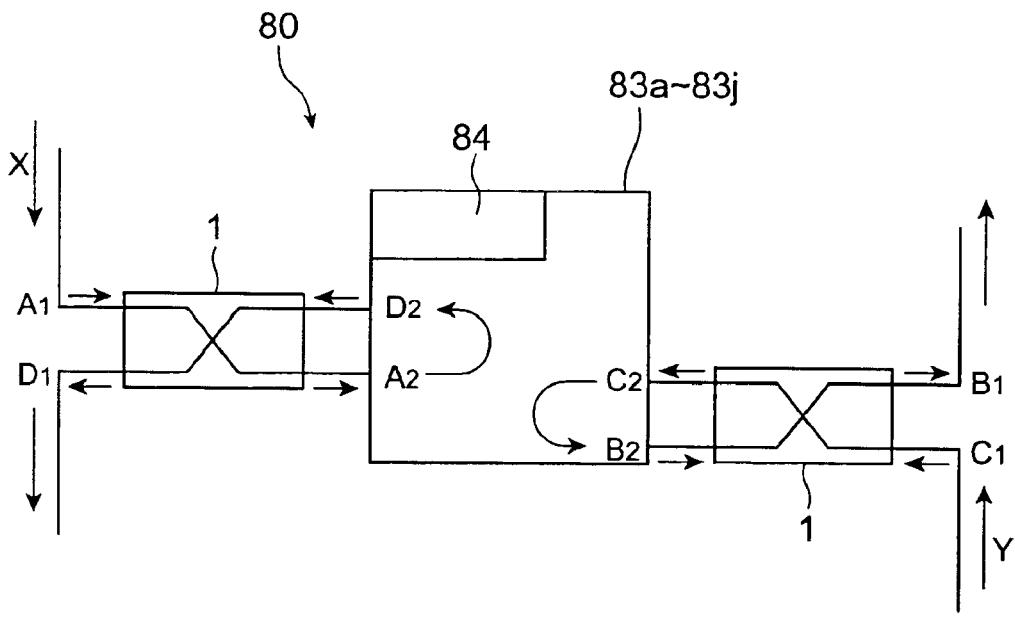
FIG. 15 is a diagram showing an operation in the normal condition of the optical transmission system shown in FIG. 14.

As shown in FIG. 15, each node 83a–83j is provided with power unit 84, and, for example, a voltage of 100 V is applied thereto. Two optical switches 1 or 50 (the description hereinafter will concern the case of optical switches 1) are connected to each node 83a–83j, and optical signals are transmitted through the optical switches 1 in the forward direction (in the direction of arrow X in the figure) and in the backward direction (in the direction of arrow Y in the figure) of the ring network 81. For example, the optical signals pass in the order of $A_1$, $A_2$, $D_2$, and $D_1$ in the forward direction, and in the order of $C_1$, $C_2$, $B_2$, and $B_1$ in the backward direction.

Figure 16:
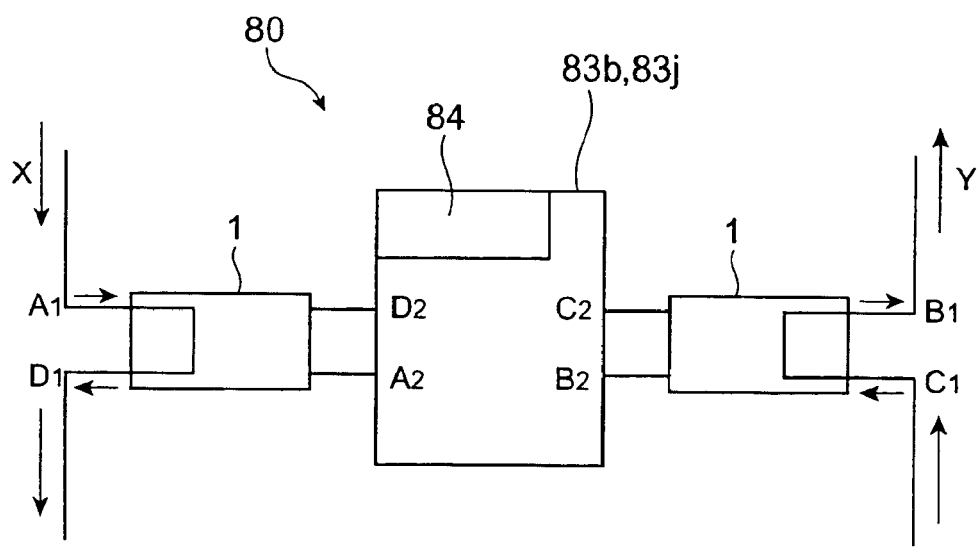
FIG. 16 is a diagram showing an operation in the event of failure in the optical transmission system shown in FIG. 14.

In the optical transmission system 80 as described above, for example, in the case where the voltage of nodes 83b, 83j drops because of power outage or the like, as shown in FIG. 14, the mirrors (not shown) of the optical switches 1 are moved from the pass position to the shut position. As a consequence, as shown in FIG. 16, optical signals pass in the order of $A_1$ and $D_1$ in the forward direction and in the order of $C_1$ and $B_1$ in the backward direction. This permits the optical signals to be transmitted to the other normal nodes, without interruption of optical communication on the ring network 81.

It is noted that the present invention is by no means intended to be limited to the above embodiments. For example, the above embodiments presented the connection of the interconnecting members to the both ends of the beamlike member, but only one interconnecting member may be connected to either of the both ends of the beamlike member.

The above embodiments defined the initial state as a state in which the mirror was located at the shut position, but it is also possible to adopt a configuration wherein the initial state is defined as a state in which the mirror is located at the pass position and wherein the mirror is moved to the shut position with application of a voltage.

Furthermore, the optical switches in the above embodiments were 2×2 switches, but the present invention is also applicable to ON/OFF switches, m×n switches, and so on.

According to the present invention, the mirror is provided on the beamlike member and the mirror is horizontally moved by deflecting the beamlike member in the directions opposite to each other, whereby no large space is necessary in the moving directions of the mirror, thus realizing the compact, highly integrated, optical switch. When the mirror is located at the position where the mirror allows the light passing on the optical path to pass or at the position where the mirror shuts out the light passing on the optical path, the beamlike member is deflected with compression stress, whereby the beamlike member (mirror) can be stably self-held at the position after driven, without need for continuously applying the driving force by the driving means.

What is claimed is:

1. An optical switch comprising:
   a base member having an optical path;
   a beamlike member supported in a doubly supported manner on an upper surface of the base member;
   a mirror fixed to the beamlike member and configured to shut out light passing on the optical path;
   driving means for moving the mirror horizontally; and
   compressive force exerting means for preliminarily exerting a compressive force on the beamlike member so as to deflect the beamlike member with compression stress in an initial state in which the mirror is located at a position where the mirror allows the light passing on the optical path to pass or at a position where the mirror shuts out the light passing on the optical path,
   wherein the compressive force exerting means comprises an interconnecting member coupled to an end portion of the beamlike member and extending in a longitudinal direction of the beamlike member and is constructed so that the compressive force exerting means exerts the compressive force on the beamlike member by exerting a force in a direction intersecting with the extending direction of the interconnecting member, on the interconnecting member.

2. The optical switch according to claim 1, wherein the compressive force exerting means further comprises an auxiliary member fixed to the interconnecting member and adapted for exerting the force in the direction intersecting with the extending direction of the interconnecting member, on the interconnecting member; and a recess provided in the base member and configured to be engaged with the auxiliary member, and
   wherein the auxiliary member is positioned relative to the recess so as to exert the compressive force on the beamlike member in said initial state, and in that state the beamlike member is fixed to the upper surface of the base member.

3. The optical switch according to claim 1, wherein the compressive force exerting means further comprises a projection provided on the base member and configured to be engaged with the interconnecting member to exert the force in the direction intersecting with the extending direction of the interconnecting member, on the interconnecting member, and
   wherein the interconnecting member is positioned relative to the base member so as to exert the compressive force on the beamlike member in the initial state, and in that state the beamlike member is fixed to the upper surface of the base member.

4. The optical switch according to claim 1, wherein the compressive force exerting means further comprises means for moving the interconnecting member in the direction intersecting with the extending direction of the interconnecting member, and
   wherein in a state in which the interconnecting member is moved in the direction intersecting with the extending direction of the interconnecting member so as to exert the compressive force on the beamlike member in the initial state, the beamlike member is fixed to the upper surface of the base member.

5. The optical switch according to claim 1, wherein said interconnecting members are coupled to both ends of the beamlike member.

6. The optical switch according to claim 1, wherein the driving means comprises a first electrode provided on one side of the beamlike member above the base member, a second electrode provided on the other side of the beamlike member above the base member, and means for generating an electrostatic force between the beamlike member and the first electrode or an electrostatic force between the beamlike member and the second electrode.

7. The optical switch according to claim 6, wherein on the both sides of the beamlike member a plurality of first comb teeth are provided so as to be opposed to the first electrode and to the second electrode, and
   wherein the first electrode and the second electrode are provided with a plurality of second comb teeth interposed between the first comb teeth.

8. The optical switch according to claim 6, wherein the beamlike member, the mirror, the first electrode, and the second electrode are made of electrically conductive Si, and
   wherein a surface of the mirror is coated with Au, Ag, or Al.

9. The optical switch according to claim 1, wherein the base member has multiple sets of said optical paths, and
   wherein a plurality of actuator structures each comprising the beamlike member and the mirror are arranged in an array pattern corresponding to the multiple sets of optical paths above the base member.

10. An optical add/drop apparatus comprising the optical switches as set forth in claim 1.

11. An optical transmission system comprising the optical switches as set forth in claim 1.

12. An optical switch comprising:
    a base member having an optical path;
    a beamlike member supported in a doubly supported manner on an upper surface of the base member;
    a mirror fixed to the beamlike member and configured to shut out light passing on the optical path;
    driving means for moving the mirror horizontally; and
    compressive force exerting means for preliminarily exerting a compressive force on the beamlike member so as to deflect the beamlike member with compression stress in an initial state in which the mirror is located at a position where the mirror allows the light passing on the optical path to pass or at a position where the mirror shuts out the light passing on the optical path,
    wherein the base member has multiple sets of said optical paths,
    wherein a plurality of actuator structures each comprising the beamlike member and the mirror are arranged in an array pattern corresponding to the multiple sets of optical paths above the base member, and, wherein an arrangement spacing between the actuator structures is not more than 1 mm.

13. A method of producing an optical switch, comprising:

a step of fabricating a base member having an optical path;

a step of fabricating a beamlike member to which a mirror for shutting out light passing on the optical path is fixed; and a step of exerting a compressive force on the beamlike member so as to deflect the beamlike member with compression stress in an initial state in which the mirror is located at a position where the mirror allows the light passing on the optical path to pass or at a position where the mirror shuts out the light passing on the optical path, and, in that state, fixing the beamlike member to an upper surface of the base member so as to support the beamlike member in a doubly supported manner thereon, wherein in the step of fabricating the beamlike member, an interconnecting member extending in a longitudinal direction of the beamlike member is coupled to an end portion of the beamlike member, and wherein in the step of fixing the beamlike member to the upper surface of the base member, a force in a direction intersecting with the extending direction of the interconnecting member is exerted on the interconnecting member, so as to exert the compressive force on the beamlike member in the initial state.

* * * * *